United States Patent Office 3,546,283
Patented Dec. 8, 1970

3,546,283
RECOVERY OF TEREPHTHALIC ACID FROM
METHANOLIC MOTHER LIQUOR
Ferdinand List and Helmut Alfs, Marl, Germany, assignors to Chemische Werke Hulls A.G., Marl, Germany
No Drawing. Filed Oct. 2, 1967, Ser. No. 672,020
Claims priority, application Germany, Oct. 12, 1966,
C 40,368
Int. Cl. C07c 51/42
U.S. Cl. 260—525                                              9 Claims

ABSTRACT OF THE DISCLOSURE

Methanolic mother liquor obtained from the esterification of terephthalic acid with methanol is saponified at elevated temperature with aqueous alkali. The saponification mixture is distilled to separate methanol from aqueous salt solution. Adding mineral acid to the aqueous salt solution permits the separation of organic acid therefrom. The organic acid may be conventionally oxidized to terephthalic acid.

Applicants hereby claim the benefit of the filing date of German patent application C 40,368, filed Oct. 12, 1966, pursuant to the provisions of 35 U.S.C. 119.

BACKGROUND OF THE INVENTION

This invention relates to a process for working up methanolic mother liquor resulting from the esterification of terephthalic acid with methanol.

Terephthalic acid is used mainly in the form of its polyesters with glycols and other diols; for this purpose, terephthalic acid dimethyl ester is normally produced first.

Commercial terephthalic acid generally contains by-products and intermediates admixed therewith. Thus, such acid is contaminated, for example, with small proportions of acetic acid, p-toluic acid and terephthalaldehydic acid (4-formyl-benzoic acid) when it is produced conventionally from p-xylene by air oxidation in the presence of heavy metal salts and bromine ions in an acetic-acid solution at elevated temperature and elevated pressure.

Although Japanese patent application 12,695/65 and Dutch patent applications 6403348 and 6508021 suggest processes for post-oxidation, hydrogenation or sublimation of crude terephthalic acid to eliminate interfering terephthalaldehydic acid, these processes are very expensive and are not technically satisfactory.

However, when aldehyde-containing terephthalic acid is directly esterified with methanol, the dimethyl ester must be freed of the aldehyde component. Towards this end, British Pat. 938,318 proposes a reaction of the aldehyde group with reactive methylene groups and subsequent distillation, whereas French Pat. 1,377,131 recommends a catalytic oxidation in the melt, as well as a distillation step. These processes are expensive and technically unsatisfactory because impurities accumulate in the methanolic mother liquor remaining after crystallization of the pure terephthalic acid dimethyl ester.

It is also known in industry that severe difficulties are encountered in working up this mother liquor containing intermediate products and methyl acetate to recover pure methanol and valuable intermediates.

Even in the mother liquor of a particularly good esterification method, for example, that obtained in accordance with German application C 27,830, there still remains dissolved, after separating the terephthalic acid dimethyl ester at a temperature of about 10° C., 10 to 20 grams of solid matter per kilogram of mother liquor. The dissolved solid matter comprises dimethyl terephthalate and monomethyl terephthalate, terephthalaldehydic acid methyl ester and toluic acid methyl ester, as well as small amounts of methyl acetate.

When this methanolic solution is subjected to fractional distillation to recover anhydrous methanol, substantial complications are encountered, e.g., possible formation of ether and olefin from methanol under the influence of acidic components; saponification of the methyl acetate, with the formation of acetic acid, it being necessary to employ special steels in view of this reaction; formation of a crystalline sludge in the sump of the distillation system; and crystallization of dimethyl terephthalate in the distillation column. Moreover, working up the crystalline sludge or slurry, consisting of various products, requires considerable effort.

SUMMARY OF THE INVENTION

An object of this invention is directed to a method which makes it possible, without appreciable effort, to process methanolic mother liquor obtained from the esterification of terephthalic acid with methanol. Thus, another object is to render more readily usable the direct esterification processes wherein terephthalic acid not previously subjected to a purification step is employed.

Upon further study of the specification and claims, other objects and advantages of the present invention will become apparent.

These objects are attained, in accordance with this invention, by treating the mother liquor at elevated temperatures with dilute aqueous alkali hydroxide solution, until esters contained therein are saponified; separating the saponification mixture by distillation into methanol and aqueous salt solution; separating the organic acid from the latter by the addition thereto of a mineral acid; and, if desired, oxidizing these organic acids, in a conventional manner, to terephthalic acid.

A suitable mother liquor is obtained, for example, in accordance with the process of German application C 27,830, corresponding to U.S. application 304,622, now abandoned.

In this process, unpurified aldehyde-containing terephthalic acid, still containing about 0.1 to 0.2% acetic acid as residual liquid, is directly esterified with methanol by continuously reacting crude terephthalic acid with vapor-phase methanol, e.g., in a weight ratio of 1:3, in the presence of coarse-grained silica gel in a rotary furnace at a temperature of 300° C. at normal pressure. The crystallized high purity ester is obtained from the receiver, whereas thus-formed intermediates, such as terephthalaldehydic acid methyl ester, terephthalic acid monomethyl ester, toluic acid methyl ester and traces of methyl acetate are accumulated in the methanolic mother liquor.

Mother liquors which can be benefitted by this invention are obtained from processes described in U.S. Pat. 2,806,052, U.S. application 358,890, now abandoned, German Pats. 968,603, 1,088,474, 1,090,641, 1,103,334, and 1,224,313, and Japanese patent application Sho. 31/7,917.

In general, the mother liquor treatable by this invention has the following composition range in weight percent:

| | |
|---|---|
| Methanol | 88.73 |
| Water | 7.50 |
| Terephthalic acid dimethyl ester | 0.45 |
| Terephthalic acid mono methyl ester | 1.85 |
| Terephthalaldehydic acid methyl ester | 0.70 |
| Toluic acid methyl ester | 0.20 |
| Benzoic acid | 0.02 |
| Acetic acid methyl ester | 0.05 |
| Unknown | 0.50 |
| | 100.00 |

As is known, the saponification temperature can be within wide limits. To terminate the reaction in a short period of time, it is advantageous to employ temperatures between 50° and 150° C., preferably between 80° and 100° C. This is particularly true if the reaction is conducted continuously, for which purpose pressurized apparatus having a design pressure of up to 2 atmospheres gauge is also required.

Suitable dilute aqueous alkali hydroxide solutions are 1 to 20%, preferably 2 to 6% by weight of sodium or potassium hydroxide solutions.

In general, sufficient alkali solution is added to impart a pH of about 10 to 14 to the saponification reaction.

The saponification is conducted with a brief residence time, e.g., from 5 to 100, preferably 10 to 30 minutes, to avoid condensation reactions of the aldehyde compound. The thus-obtained homogeneous solution is subjected to a simple distillation, there being obtained as the head product pure methanol having a saponification number of 0, and as the sump product there is withdrawn an aqueous solution of the alkali salts. This separation may be performed in any way that will give pure methanol on the one hand, an alkali salt solution of the acids on the other. The saponified mother liquor contains aldehydic compounds that are sensitive to heat; therefore it is recommendable to evaporate the solution at low temperatures within a short time. For this purpose, thin-film evaporators proved best, as described in the example. In this case, a vapor of methanol and water is obtained from the evaporator and may be distilled after condensation in a separate column. The alkali salt solution is obtained at the bottom of the evaporator.

Thereafter, the alkali salt solution is mixed with a mineral acid, such as hydrochloric acid or hydrogen chloride gas, or sulfuric acid. Sufficient mineral acid is added to precipitate the organic acids, the pH of the resultant slurry being about 1 to 3, preferably 1.5 to 2.5. The precipitation temperature is generally about 20 to 90° C., preferably about 50 to 70° C.

The acids which precipitate, including the aldehydic acid, are separated by filtration. This separated acid mixture can now, if desired, be converted to terephthalic acid in an almost quantitative yield by catalytic air oxidation in an acetic acid solution in the presence of heavy metal salts. Details of the latter oxidation step are found in U.S. Pat. 3,313,849.

In the process of this invention, water-soluble impurities are also simultaneously separated. It is of particular advantage that the entire process can be conducted in an iron apparatus.

Without further elaboration, it is believed that one skilled in the art can, using the preceding description, utilize the present invention to its fullest extent. The following preferred specific embodiments are, therefore, to be construed as merely illustrative, and not limitative, of the remainder of the specification and claims in any way whatsoever.

EXAMPLE 1

Methanolic mother liquor, from conventional esterification process for the preparation of commercial terephthalic acid, having a saponification number of 10, is mixed in a weight ratio of 1:0.3, with 4% aqueous sodium hydroxide solution (120% of the required alkali, based on the saponification number). Thereafter, the mixture is conveyed, by means of a reciprocating pump, through a heated iron coil of 2 liters capacity. The internal temperature is 95° C., and the pressure is 1.5 atmospheres gauge. Corresponding to the mother liquor and alkali feed, the reaction mixture is withdrawn at the end of the coil by way of a control valve. The hourly throughput is 6 liters, corresponding to a residence time of 20 minutes. Subsequently, the withdrawn reaction mixture is separated into its components in a thin-film evaporator of the type described in Swiss Pat. 248,799.

The methanol-steam mixture exiting from the thin-film evaporator is distilled in a distillation column, pure methanol (saponification number=0.0, methanol content >99.8%) being withdrawn at the head. Water, obtained in the sump, is discarded.

The sodium salt solution obtained at the bottom of the thin-film evaporator is introduced directly into dilute, hot (about 60° C.), approximately 20 to 30% hydrochloric acid or sulfuric acid. The acid thus precipitated is filtered and washed with water. A crude acid mixture having the following composition is thus obtained:

| | App. percent |
|---|---|
| Terephthalaldehydic acid | 30 |
| Terephthalic acid | 65 |
| Other acids, mainly toluic acid | 5 |

If said mixture is subjected to air oxidation at 180° to 190° C. in the presence of acetic acid and cobalt salts and bromine ions, terephthalic acid of an excellent quality is obtained, in an almost quantitative yield:

Acid number=673.
Terephthaladehydic acid <0.5%.

Air oxidation step

The crude acid, dissolved in acetic acid (1:10 parts) is oxidized continuously under the following conditions in an oxidation tower of corrosion-proof material, provided with an air inlet frit:

Temperature: 180 to 190° C.
Pressure: 10 atmospheres.
Catalyst:
    0.5 parts of weight cobalt acetate.
    0.3 parts barium bromide.

After 15 minutes oxidation with air the mixture is cooled to room temperature. The precipitated terephthalic acid is filtered, washed with acetic acid and dried.

The methanolic mother liquor of this example is conventionally produced by the process of U.S. patent application 304,622 (German Pat. 1,224,313), e.g. This process comprises continuously contacting a continuously agitated mass of a mixture of terephthalic acid in the solid state and a granular solid esterification catalyst with an excess of methanol in the gaseous state at a temperature of about 280 to 300° C. in a tunnel oven. The catalyst may be silica gel, aluminum oxide, borophosphate, e.g.; it drops at the rear end of the tube from the oven into a collecting funnel while the ester, the excess methanol and the reaction water are drawn off in the form of vapor. This vapor is cooled, whereby the terephthalic dimethyl esters crystallizes and is obtained by filtration. The remaining liquid is the mother liquor of this example.

The present invention makes possible direct esterification of crude terephthalic acid without the problem of the esterification residues in the mother liquor, since the latter can now be worked up quantitatively, without any appreciable effort, into the desired starting materials—terephthalic acid and methanol. In this connection, it is particularly beneficial that these substances are obtained in an excellent purity.

The preceding examples can be repeated with similar success by substituting the generically and specifically described reactants and operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:
1. In a process for the purification of terephthalic acid comprising the steps of reacting excess methanol with a crude terephthalic acid containing as impurities terephthaldehydic acid, acetic acid and toluic acid to obtain a solid phase of crystallized high purity dimethylterephthalate and predominantly methanolic mother liquor containing minor quantities of dissolved dimethyl terephthalate, monomethyl terephthalate, methyl ester of terephthaldehydic acid, methyl ester of toluic acid, and methyl acetate; separating said crystallized high purity dimethyl terephthalate from said mother liquor, the improvement in recovering methanol from said mother liquor comprising the steps of:

reacting the mother liquor at about 50–150° C. for about 5–100 minutes with dilute aqueous alkali hydroxide solution; and distilling the resulting saponification mixture into methanol and aqueous salt solution.

2. A process according to claim 1 wherein the reacting of the mother liquor is conducted at 80–100° C. for 10–30 minutes and said dilute aqueous alkali hydroxide is a member selected from the group consisting of sodium hydroxide and potassium hydroxide having a concentration of 2–6% by weight.

3. A process as defined by claim 2 wherein said mother liquor has substantially the following composition in weight percent:

| | |
|---|---|
| Methanol | 88.73 |
| Water | 7.50 |
| Terephthalic acid dimethyl ester | 0.45 |
| Terephthalic acid mono methyl ester | 1.85 |
| Terephthaladehydic acid methyl ester | 0.70 |
| Toluic acid methyl ester | 0.20 |
| Benzoic acid | 0.02 |
| Acetic acid methyl ester | 0.05 |
| Unknown | 0.50 |
| | 100.00 |

4. A process as defined by claim 1 wherein said reacting of said mother liquor is conducted for 10–30 minutes.

5. A process as defined by claim 1 comprising the further step of adding mineral acid to said aqueous salt solution to precipitate crude terephthalic acid.

6. A process as defined by claim 2 comprising the further step of adding mineral acid to said aqueous salt solution to precipitate crude terephthalic acid.

7. A process as defined by claim 4 comprising the further step of adding mineral acid to said aqueous salt solution to precipitate crude terephthalic acid.

8. A process according to claim 5 wherein the elevated temperature is from 80 to 120° C., the dilute aqueous alkali hydroxide is a member selected from the group consisting of sodium hydroxide and potassium hydroxide and having a concentration of from 1 to 20% by weight and the mineral acid is a member selected from the group consisting of hydrochloric acid and sulfuric acid.

9. A process as defined by claim 8, comprising the further step of subjecting the thus-obtained crude terephthalic acid to air oxidation at 180° to 190° C. in the presence of acetic acid, cobalt salt and bromine ions, whereby terephthalic acid of excellent quality is obtained in almost quantitative yield.

References Cited

UNITED STATES PATENTS 2,880,237  3/1959  Knobloch _____ 260—524
3,012,038  12/1961  O'Neill et al. _____ 260—524

JAMES A. PATTEN, Primary Examiner

R. S. WEISSBERG, Assistant Examiner

U.S. Cl. X.R.

260—475, 524